(12) United States Patent
Janardhan et al.

(10) Patent No.: US 7,912,612 B2
(45) Date of Patent: Mar. 22, 2011

(54) PAYLOAD SYSTEM THAT COMPENSATES FOR ROTATIONAL FORCES

(75) Inventors: Vijayakumar Janardhan, Washington, IL (US); Jeffrey Kent Berry, Yorkville, IL (US); Brian Mintah, Washington, IL (US); Everett Gene Brandt, Brimfield, IL (US); Robert J. Price, Dunlap, IL (US); Kevin Dwight King, Peoria, IL (US); Shoji Tozawa, Hyogo-ken (JP)

(73) Assignee: Caterpillar Inc., Peoria, IL (US)

( * ) Notice: Subject to any disclaimer, the term of this patent is extended or adjusted under 35 U.S.C. 154(b) by 766 days.

(21) Appl. No.: 11/998,425

(22) Filed: Nov. 30, 2007

(65) Prior Publication Data

US 2009/0139119 A1    Jun. 4, 2009

(51) Int. Cl.
*E02F 9/26* (2006.01)
*G06F 19/14* (2006.01)

(52) U.S. Cl. .............................. 701/50; 701/124; 37/413

(58) Field of Classification Search .................. 701/50, 701/54, 29, 33, 35, 124; 37/413; 700/213; 172/4.5, 7; 414/694, 699
See application file for complete search history.

(56) References Cited

U.S. PATENT DOCUMENTS

| | | | |
|---|---|---|---|
| 2,635,868 A | 4/1953 | Reid et al. |
| 3,061,117 A | 10/1962 | Kruse |
| 4,230,196 A | 10/1980 | Snead |
| 4,499,960 A | 2/1985 | Ehrich et al. |
| 4,627,013 A | 12/1986 | Ichiyama et al. |
| 4,677,579 A | 6/1987 | Radomilovich |
| 4,792,004 A | 12/1988 | Sheffield |
| 4,809,794 A | 3/1989 | Blair et al. |
| 4,995,468 A | 2/1991 | Fukuda |
| 5,067,572 A | 11/1991 | Kyrtsos et al. |
| 5,070,953 A | 12/1991 | Kyrtsos et al. |
| 5,082,071 A | 1/1992 | Kyrtsos et al. |
| 5,105,896 A | 4/1992 | Kyrtsos |
| 5,167,287 A | 12/1992 | Pomies |
| 5,321,637 A | 6/1994 | Anderson et al. |
| D362,402 S | 9/1995 | Hite |
| 5,509,293 A | 4/1996 | Karumanchi |

(Continued)

FOREIGN PATENT DOCUMENTS

WO    2006098645    9/2006

OTHER PUBLICATIONS

Tafazoli et al., "Parameter Estimation and Actuator Friction Analysis for a Mini Excavator," Proceedings of the 1996 IEEE International Conference on Robotics and Automation, Minneapolis, Minnesota, Apr. 1996, vol. 1, pp. 329-334.

(Continued)

*Primary Examiner* — Tan Q Nguyen
(74) *Attorney, Agent, or Firm* — Finnegan, Henderson, Farabow, Garrett & Dunner, LLP (57) ABSTRACT

The present disclosure is directed to a payload calculation system for use with a work implement. The payload calculation system may have a state sensor configured to measure a state of the work implement. The payload calculation system may further have a processing device configured to calculate a mass of a payload moved by the work implement. The processing device may be configured to use the measured state to compensate the calculation of the mass for centrifugal, inertial, and frictional forces of the work implement caused by the work implement rotating about a vertical pivot.

20 Claims, 4 Drawing Sheets

U.S. PATENT DOCUMENTS

| | | | |
|---|---|---|---|
| 5,557,526 A * | 9/1996 | Anderson | 701/50 |
| 5,714,719 A | 2/1998 | Otsuka et al. | |
| 5,823,369 A | 10/1998 | Kuromoto | |
| 5,824,965 A | 10/1998 | Fujii et al. | |
| 6,052,925 A | 4/2000 | Reiners | |
| 6,072,127 A | 6/2000 | Oslakovic | |
| 6,122,598 A | 9/2000 | Tanaka et al. | |
| 6,211,471 B1 | 4/2001 | Rocke et al. | |
| 6,225,574 B1 | 5/2001 | Chang et al. | |
| 6,385,519 B2 * | 5/2002 | Rocke | 701/50 |
| 6,518,519 B1 | 2/2003 | Crane, III et al. | |
| 6,552,279 B1 | 4/2003 | Lueschow et al. | |
| 6,931,772 B2 | 8/2005 | Furuno et al. | |
| 6,947,819 B2 * | 9/2005 | Nelson et al. | 701/50 |
| 7,082,375 B2 * | 7/2006 | Lueschow | 702/101 |
| 2005/0000703 A1 | 1/2005 | Furuno et al. | |
| 2006/0074578 A1 | 4/2006 | Lueschow | |

OTHER PUBLICATIONS

Craig et al., "Adaptive Control of Mechanical Manipulators," IEEE, 1986, pp. 190-195.

Hsu et al., "Adaptive Identification and Control for Manipulators Without Using Joint Accelerations," Robotics and Automation, Proceedings, IEEE International Conference, vol. 4, Mar. 1987, pp. 1210-1215.

Khosla et al., "An Algorithm to Estimate Manipulator Dynamics Parameters," Department of Electrical and Computer Engineering, the Robotics Institute, Carnegie Mellon University, Pittsburgh, PA, Mar. 1987, pp. 1-24.

Tafazoli et al., "Identification of Inertial and Friction Parameters for Excavator Arms," IEEE Transactions on Robotics and Automation, vol. 15, No. 5, Oct. 1999, pp. 966-971.

Pagilla et al., "Adaptive Control of a Robot Carrying a Time-Varying Payload," Proceedings of the 2000 IEEE International Conference on Control Applications, Sep. 2000, pp. 68-73.

Kholsa, "Estimation of Robot Dynamics Parameters: Theory and Application," Carnegie Melon University, Mar. 1987, pp. 1-19.

Tafazoli, "Identification of Frictional Effects and Structural Dynamics for Improved Control of Hydraulic Manipulators," The University of British Columbia, Jan. 1997, pp. 1-150.

* cited by examiner

PAYLOAD SYSTEM THAT COMPENSATES FOR ROTATIONAL FORCES

TECHNICAL FIELD

The present disclosure relates generally to a payload calculation system and, more particularly, to a payload calculation system that compensates for centrifugal, inertial, and frictional forces of the work implement caused by the work implement rotating about a vertical pivot.

BACKGROUND

Various types of machines may use a work implement to transfer material from a work site and load this material onto transport vehicles (e.g., trucks and railroad cars). These machines include excavators, wheel loaders, backhoes, and other material moving machines. The transport vehicles that are loaded by the machines may have a particular load capacity determined by a manufacturer's maximum load rating and/or other factors, such as, for example, weight restrictions for on-highway vehicles. To promote maximum utilization of the transport vehicles, it may be desirable to load each transport vehicle as close as possible to its load capacity. Overloading the transport vehicle, however, may have negative consequences. Particularly, placing too much weight on a transport vehicle can significantly increase maintenance costs for the transport vehicle or create costly delays if the excess material is removed prior to transport.

To monitor the weight of the material placed onto each transport vehicle, machine manufacturers have developed payload calculation systems. A payload calculation system may determine the weight of a material currently carried by the work implement (e.g., weight of material in an excavator bucket), as well as the total weight of a material loaded onto a transport vehicle during a particular cycle or time period. For improved productivity, the payload calculation system may determine the weight of a material carried by the machine and/or work implement while the machine and/or work implement is in motion (rather than performing static measurements).

One method for determining the mass moved by a work implement is disclosed in "Identification of Inertial and Friction Parameters for Excavator Arms" by Tafazoli et al. (the Tafazoli publication) published in October 1999. The Tafazoli publication discloses a mini excavator with instrumentation and computer control. The computer controller includes a dynamic model of the mini excavator's rigid link manipulator. The model predicts the joint torques of the mini excavator in both static and dynamic conditions and accounts for Coulomb and viscous friction in a dynamic condition. The results of the Tafazoli publication along with a developed algorithm can be used for dynamic payload monitoring.

Although the mini excavator of the Tafazoli publication may account for viscous and Coulomb friction in a dynamic condition, it may still be suboptimal. Specifically, the model of the Tafazoli publication may not account for certain rotational forces (i.e., centrifugal and inertial forces due to rotation of the manipulator about an axis that is substantially perpendicular to the surface below the mini excavator). Neglecting these rotational forces may introduce errors into the calculation of the payload mass.

The disclosed machine system is directed to overcoming one or more of the problems set forth above.

SUMMARY

In one aspect, the present disclosure is directed to a payload calculation system for use with a work implement. The payload calculation system may include a state sensor configured to measure a state of the work implement. The payload calculation system may further include a processing device configured to calculate a mass of a payload moved by the work implement. The processing device may be configured to use the measured state to compensate the calculation of the mass for centrifugal, inertial, and frictional forces of the work implement caused by the work implement rotating about a vertical pivot.

In another aspect, the present disclosure is directed to a method of calculating a payload. The method may include actuating a work implement to move a payload. The method may also include measuring a state of the work implement. The method may further include calculating a mass of the payload moved by the work implement using the measured state and compensating the calculation of the mass for centrifugal, inertial, and frictional forces of the work implement caused by the work implement rotating about an axis that is substantially normal to a work surface.

DETAILED DESCRIPTION

Figure 1:
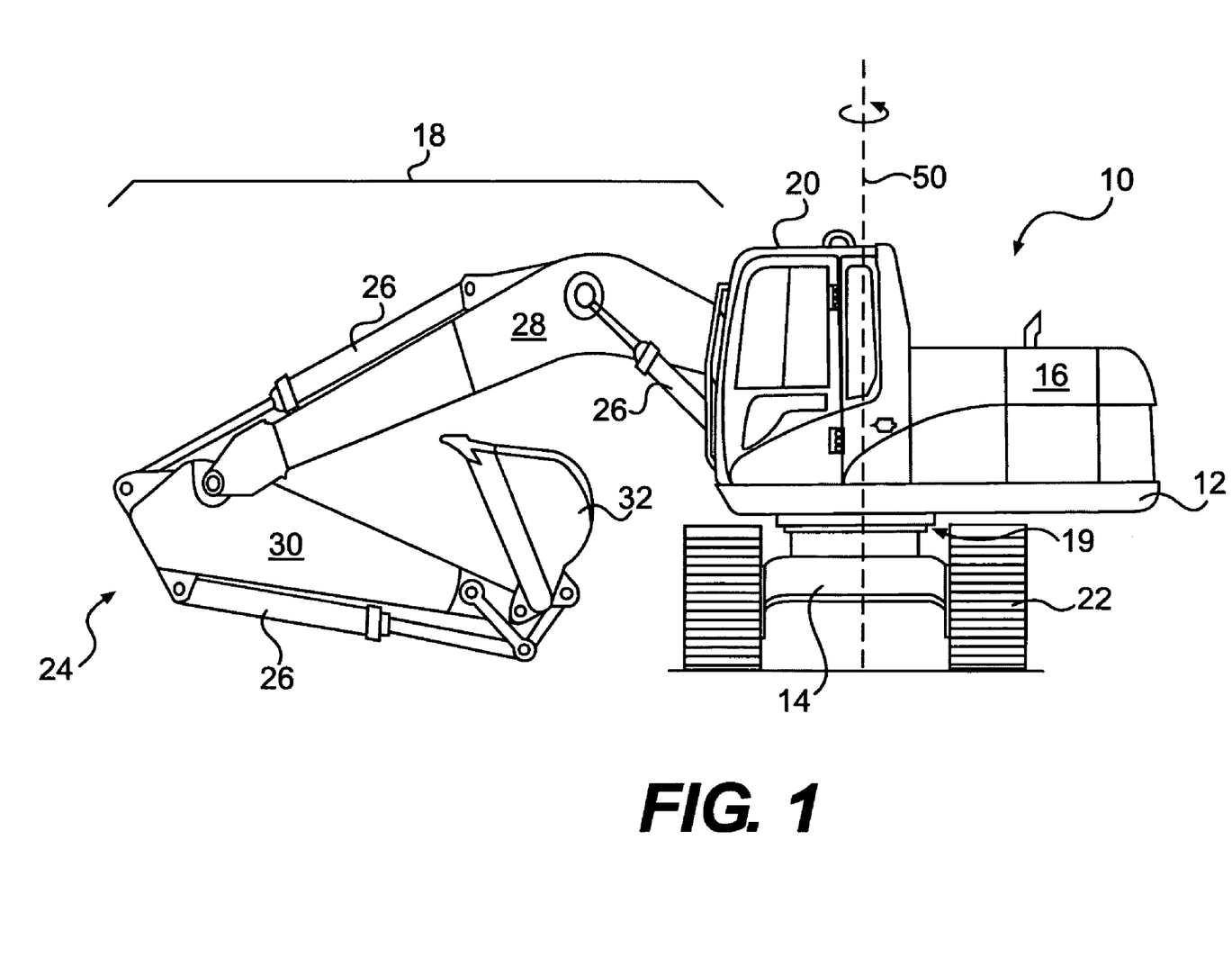
FIG. 1 is a diagrammatic illustration of an exemplary disclosed machine.

FIG. 1 illustrates an exemplary machine 10. Machine 10 may be a mobile machine that performs some type of operation associated with an industry such as mining, construction, farming, transportation, or any other industry known in the art. For example, machine 10 may be an earth moving machine, such as an excavator, a wheel loader, a backhoe, or any other suitable earth moving machine known in the art. Machine 10 may include a platform 12, an undercarriage 14 to which platform 12 is rotatably coupled, a power source 16, and a work implement 18 coupled to platform 12.

Platform 12 may be a structural member that supports an operator station 20 (operator station 20 may be a location from which an operator may control machine 10). Platform 12 may be coupled to undercarriage 14 via a vertical pivot 19. Vertical pivot 19 may allow platform 12 to rotate relative to undercarriage 14 about an axis 50. In other words, vertical pivot 19 may allow work implement 18 to swing or rotate in a plane substantially parallel to a work surface under machine 10 (axis 50 may be substantially normal to the work surface). In an alternative configuration (not shown), platform 12 and undercarriage 14 may be fixedly coupled and a vertical pivot or ball-type joint may couple work implement 18 to platform 12. The vertical pivot or ball-type joint of the alternative configuration may also allow for swinging or rotation of work implement 18 (axis 50 now being located at the vertical pivot or ball-type joint).

Undercarriage 14 may be a structural support for one or more traction devices 22. Traction devices 22 may include tracks located on each side of machine 10 configured to allow translational motion of machine 10 across a work surface. Alternatively, traction devices 22 may include wheels, belts, or other traction devices known in the art. Any of traction devices 22 may be drivable and/or steerable. It is contemplated that swinging or rotation of work implement 18 may also be achieved by driving one traction device 22 in a first direction while driving a second traction device 22 in a second direction generally opposite to the first direction.

Power source 16 may provide power for the operation of machine 10. Power source 16 may embody a combustion engine, such as a diesel engine, a gasoline engine, a gaseous fuel powered engine (e.g., a natural gas engine), or any other type of combustion engine known in the art. Power source 16 may alternatively embody a non-combustion source of power, such as a fuel cell or other power storage device coupled to a motor. Power source 16 may provide a rotational output to drive traction device 22, thereby propelling machine 10. Power source 16 may also provide power to rotate platform 12 relative to undercarriage 14.

Work implement 18 may include one or more linkage members 24 designed to achieve a particular task. Specifically, linkage members 24 may embody a boom member 28, a stick member 30, and a work tool 32. A first end of boom member 28 may be pivotally connected to platform 12, and a second end of boom member 28 may be pivotally connected to a first end of stick member 30. Work tool 32 may be pivotally connected to a second end of stick member 30. It is contemplated that work tool 32 may embody, for example, a bucket, a grappler, a fork, a lifting hook, or any other appropriate work tool known in the art. Each linkage member 24 may include and be actuated by one or more actuators 26. It is contemplated that linkage members 24 may pivot in a plane that is approximately orthogonal to the work surface.

Figure 2:
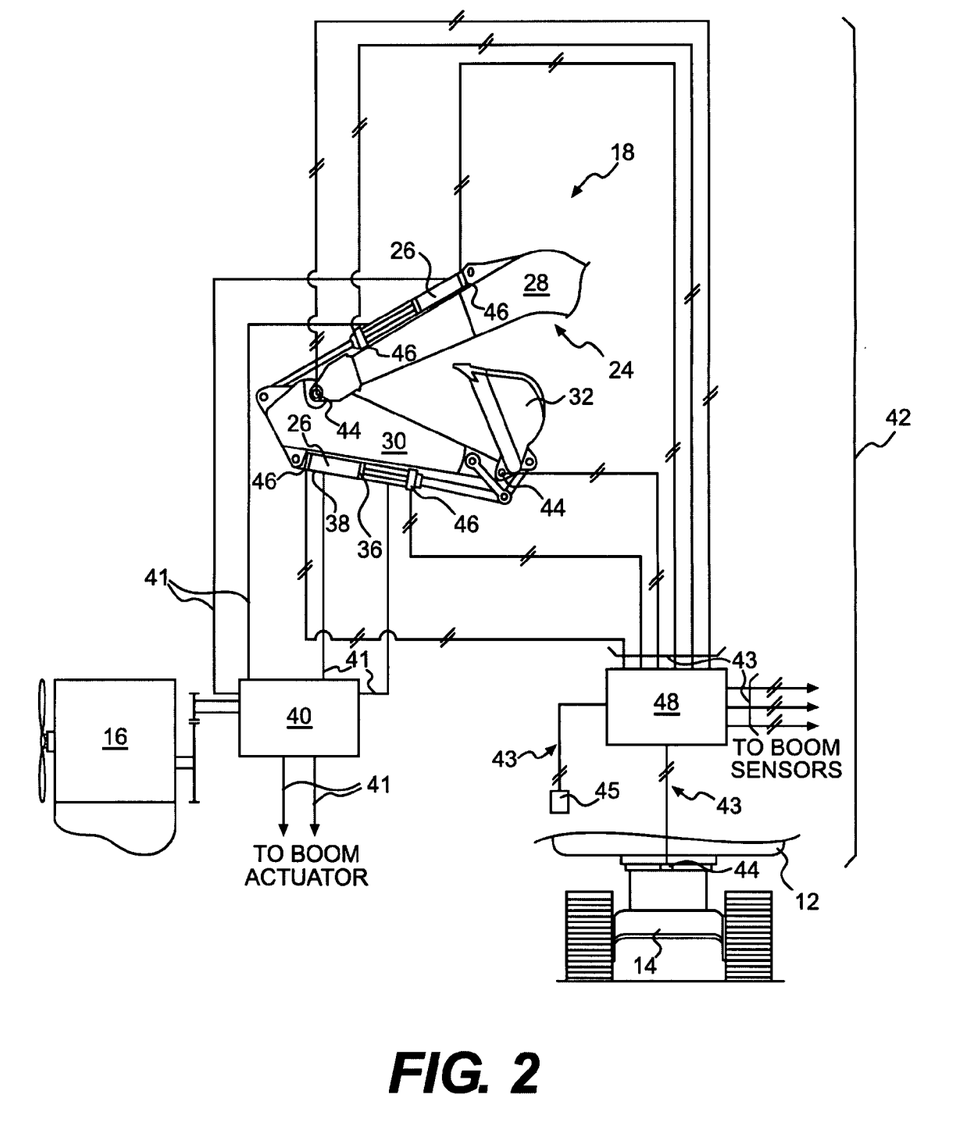
FIG. 2 is a schematic and diagrammatic illustration of an exemplary disclosed payload calculation system that may be used with the machine of FIG. 1.

As shown in FIG. 2, each actuator 26 may be a hydraulic cylinder that includes, for example, a piston assembly 36 and a tube 38. Piston assembly 36 may include two hydraulic surfaces, one surface associated with a first chamber and another surface associated with a second chamber. The first and/or second chambers may be selectively supplied with a pressurized fluid and drained of the pressurized fluid to create an imbalance of forces on the two hydraulic surfaces. The imbalance of forces may cause piston assembly 36 to axially displace within tube 38. It is also contemplated that actuators 26 may alternatively embody electric motors, pneumatic motors, or any other actuation devices known in the art.

A hydraulic system 40 may provide pressurized fluid to power each actuator 26. Specifically, hydraulic system 40 may include a pump (not shown) and a plurality of control valves (not shown). The pump (powered by a rotational output of power source 16) may pressurize a hydraulic fluid that is communicated to the plurality of control valves. The plurality of control valves may selectively supply the pressurized fluid via one or more hydraulic lines 41 to the first and/or second chambers of actuators 26, thus causing the axial displacement of piston assembly 36. It is contemplated that hydraulic system 40 may include additional or different components, such as, for example, accumulators, check valves, pressure relief or makeup valves, pressure compensating elements, restrictive orifices, and other hydraulic components known in the art.

As further shown in FIG. 2, machine 10 may include a payload calculation system 42 configured to calculate or estimate a mass (or weight) moved by work implement 18. Payload calculation system 42 may include one or more state sensors 44, an attitude sensor 45, one or more force sensors 46, and a processing device 48.

State sensors 44 may be angle sensing devices located near one or more joints of linkage members 24 (i.e., joint between work tool 32 and stick member 30, joint between stick member 30 and boom member 28, and joint between boom member 28 and platform 12). State sensors 44 may include rotary encoders, potentiometers, or other angle or position sensing devices (e.g., state sensor 44 may be located on a linear actuator and may be configured to determine a joint angle using an actuator position). Output signals of state sensors 44 may be used to determine a state of work implement 18, such as, for example, a position, a velocity, an acceleration, an angle, an angular velocity, or an angular acceleration of each linkage member 24. One or more state sensors 44 may additionally be located near a rotational joint between platform 12 and undercarriage 14 and may be configured to measure an angle, an angular velocity, or an angular acceleration of platform 12 relative to undercarriage 14.

Force sensors 46 may be configured to output a signal usable to determine a force created or experienced by actuators 26 and/or linkage members 24. For example, force sensors 46 may embody pressure sensors located and configured to measure the pressure of the pressurized fluid within or supplied to the first and/or second chambers of actuators 26. It is contemplated that the measured pressure may be used along with the physical dimensions of actuators 26 and linkage members 24 to determine joint torques of linkage members 24. It is further contemplated that force sensors 46 may alternatively embody strain gauges, piezoelectric transducers, or other force sensing devices located at linkage joints, actuator joints, or other appropriate locations.

Attitude sensor 45 may measure the pitch and roll of machine 10. Attitude sensor may be located at any appropriate location on machine 10, such as, for example, at operator station 20. Attitude sensor 45 may embody one or more gyroscopes, accelerometers, gravitational inclinometers, or any combination thereof.

Processing device 48 may monitor and/or modify the performance of machine 10 and its components. Processing device 48 may communicate via one or more communication lines 43 (or wirelessly) with state sensors 44, attitude sensor 45, and force sensors 46. It is contemplated that processing device 48 may also communicate (not shown) with power source 16, operator station 20, hydraulic system 40, and/or other components of machine 10.

Processing device 48 may embody a single microprocessor or multiple microprocessors. Numerous commercially available microprocessors may be configured to perform the functions of processing device 48, and it should be appreciated that processing device 48 may readily embody a general machine microprocessor capable of monitoring and/or controlling numerous machine functions. Processing device 48 may include a memory, a secondary storage device, a processor, and any other components for running an application. Various other circuits may be associated with processing device 48, such as, for example, power supply circuitry, signal conditioning circuitry, data acquisition circuitry, signal output circuitry, signal amplification circuitry, and other types of circuitry known in the art. Processing device 48 may include one or more maps stored within the internal memory of processing device 48. Each of these maps may include a collection of data in the form of tables, graphs, and/or equations. Processing device 48 may include a dynamic model, a calibration procedure, and an estimation procedure.

The dynamic model may include an equation that relates the joint torques T to other measurable and/or calculable terms. T may be a vector or array that includes joint torque values at each joint of work implement 18, such as, for example, $T_{bo}$, $T_{st}$, and $T_{wt}$ (see FIG. 3). It is contemplated that the dynamic model may include any appropriate model known in the art (e.g., mathematical or logic-based relationship). One example of an acceptable dynamic model is:

$$T = M(q)\ddot{q} + N(q,\dot{q})\dot{q} + G(q) + F(\dot{q}), \quad (1)$$

where q is the linkage-state vector, M(q) is the inertia matrix, N(q,q̇) is the matrix of Coriolis and centrifugal terms, G(q) is the gravity torque matrix, and F(q̇) is the friction matrix. The joint torque relationship of the dynamic model may be converted and represented as a linear-in-the-parameters model of the following form:

$$T = W(q,\dot{q},\ddot{q})\Psi, \quad (2)$$

where W(q, q̇, q̈) is a matrix of nonlinear functions and Ψ is a parameter vector.

$$\Psi = \begin{bmatrix} \psi_1 \\ \psi_2 \\ \vdots \\ \psi_N \end{bmatrix} \quad (3)$$

Figure 3:
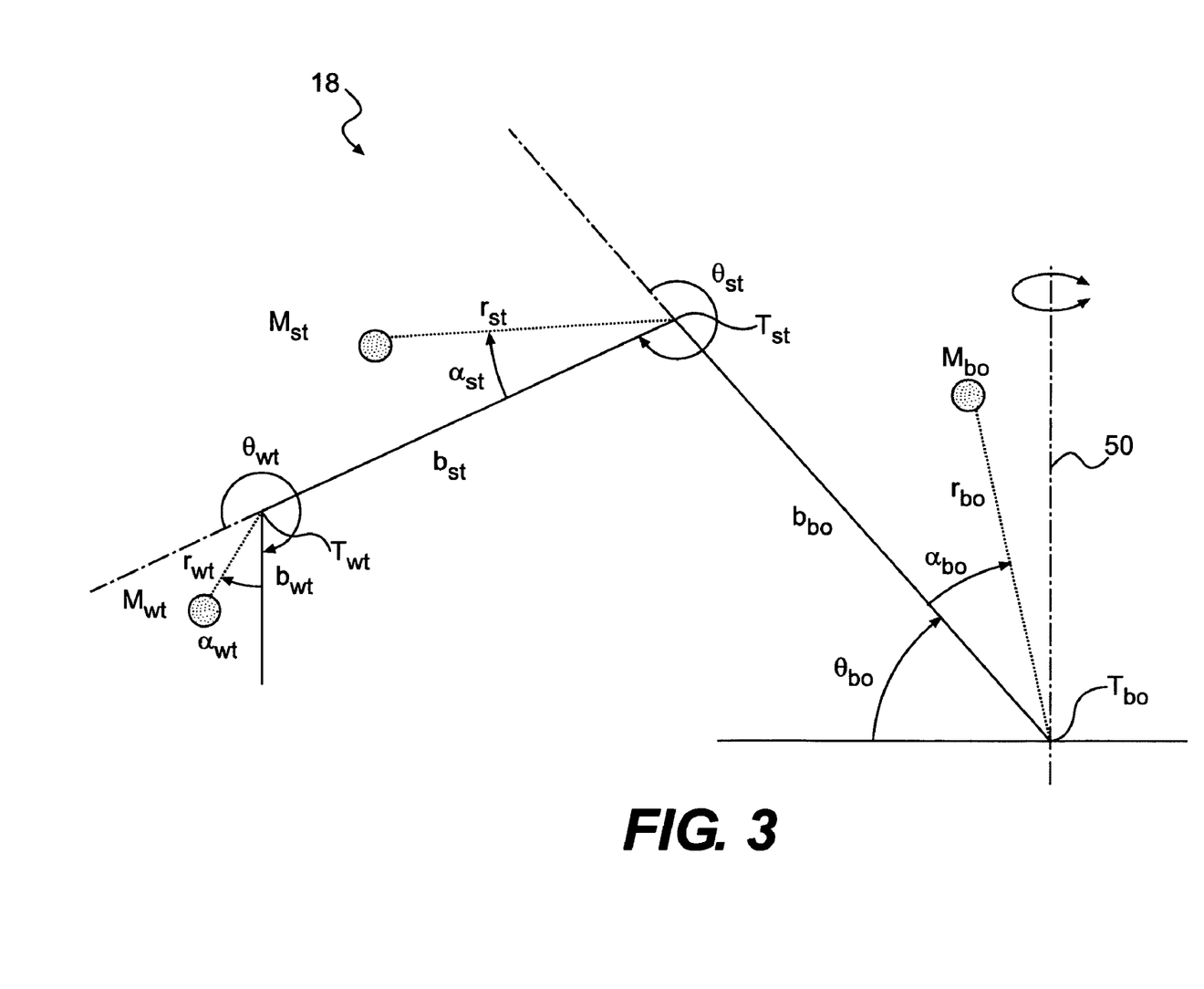
FIG. 3 is a schematic of an exemplary disclosed work implement.

Each element of the parameter vector ψ may include terms related to the linkage member's dimensions mass M, inertia I, and center-of-gravity ("CG") location. For example, the parameter vector may be represented as:

$$\Psi = \begin{bmatrix} I_{wt} + M_{wt}r_{wt}^2 \\ I_{st} + M_{st}r_{st}^2 + M_{wt}b_{st}^2 \\ I_{bo} + M_{bo}r_{bo}^2 + (M_{st} + M_{wt})b_{bo}^2 \\ M_{wt}r_{wt}\cos(\alpha_{wt}) \\ M_{wt}r_{wt}\sin(\alpha_{wt}) \\ M_{wt}b_{st} + M_{st}r_{st}\cos(\alpha_{st}) \\ M_{st}r_{st}\sin(\alpha_{st}) \\ (M_{wt} + M_{st})b_{bo} + M_{bo}r_{bo}\cos(\alpha_{bo}) \\ M_{bo}r_{bo}\sin(\alpha_{bo}) \end{bmatrix} \quad (4)$$

where, as also shown in FIG. 3, α and r are the angle and the radius defining the CG location of a given linkage member, the origin of r being the linkage member's joint (the given linkage member may be boom member 28, stick member 30, or work tool 32), b is the length of the given linkage member, the subscript "wt" designates a term related to work tool 32, "st" designates a term related to stick member 30, and "bo" designates a term related to boom member 28.

Returning to FIG. 2, the calibration procedure may be used for calibration of payload calculation system 42. During calibration, processing device 48 may take measurements from state sensors 44, attitude sensor 45, and force sensors 46 (work implement 18 may be moving or static during measurements). Using Equation (2), processing device 48 may use the sensor data (e.g., joint torque data at given linkage member angles) and pre-programmed linkage data (e.g., physical dimensions of linkage members 24) in conjunction with a least squares algorithm to solve for the parameter vector Ψ. It is contemplated that any other appropriate calibration or analytical procedure may alternatively be used to calibrate the dynamic model.

The estimation procedure may be used to calculate a mass of a payload moved by work implement 18 (payload may be a material, an object, or any other mass). To calculate the mass of the payload $M_{PL}$, Equation (2) may be written as:

$$T = W(q,\dot{q},\ddot{q})\Psi + \hat{W}(q,\dot{q},\ddot{q})M_{PL} \quad (6)$$

where Ŵ(q,q̇,q̈) is a second matrix of nonlinear functions. In an exemplary operation, the operator may command work implement 18 to pick up and move a material or object to a new location where it may be unloaded. While moving the material or object, processing device 48 may receive data from state sensors 44 and force sensors 46. The data from state sensors 44 (i.e., state data) may include, for example, a position, a velocity, an acceleration, an angle, an angular velocity, or an angular acceleration of each linkage member 24. Processing device 48 may use the received sensor data (i.e., state data and joint torque data) and the pre-programmed linkage data to determine and/or set the values for T, W(q,q̇,q̈), Ψ, and Ŵ(q,q̇,q̈) of Equation (6). In other words, the joint toque data may be used to set T. Ψ may be determined a priori (e.g., from calibration), and W(q,q̇,q̈) and Ŵ(q,q̇,q̈) may be determinable using the sensor data and/or the pre-programmed linkage data. Processing device 48 may then use a least squares technique and/or an adaptive estimation technique (based on Lyapunov theory) to calculate $M_{PL}$.

Rotating or swinging work implement 18 about axis 50 may create centrifugal or inertial forces, which may in turn create moments on work implement 18. The moment due to the centrifugal and inertial forces at the joint between work tool 32 and stick member 30 may be given by:

$$MF3_{wt} = f_1(F_{wt,pl}, \theta_{bo}, \theta_{st}, \theta_{wt}, \alpha_{bo}, \alpha_{st}, \alpha_{wt}), \quad (7)$$

where $f_1$ is a nonlinear function and $F_{wt,pl}$ represents the centrifugal and inertial forces due to the rotation of work tool 32 and the mass of the payload about axis 50. The moments due to the centrifugal and inertial forces at the joint between stick member 30 and boom member 28 may be given by:

$$MF3_{st} = f_2(F_{wt,pl}, \theta_{bo}, \theta_{st}, \theta_{wt}, \alpha_{bo}, \alpha_{st}, \alpha_{wt}) \text{ and} \quad (8)$$

$$MF2_{st} = g_1(F_{st}, \theta_{bo}, \theta_{st}, \alpha_{bo}, \alpha_{st}), \quad (9)$$

where $f_2$ and $g_1$ are nonlinear functions and $F_{wt,pl}$ represents the centrifugal and inertial forces due to the rotation of stick member 30 about axis 50. Finally, the moments due to the centrifugal and inertial forces at the joint between boom member 28 and platform 12 may be given by:

$$MF3_{bo} = f_3(F_{wt,pl}, \theta_{bo}, \theta_{st}, \theta_{wt}, \alpha_{bo}, \alpha_{st}, \alpha_{wt}), \quad (10)$$

$$MF2_{bo} = g_2(F_{st}, \theta_{bo}, \theta_{st}, \alpha_{bo}, \alpha_{st}), \text{ and} \quad (11)$$

$$MF1_{bo} = h_1(F_{bo}, \theta_{bo}, \alpha_{bo}), \quad (12)$$

where $f_3$, $g_2$, and $h_1$ are nonlinear functions and $F_{bo}$ represents the centrifugal and inertial forces due to the rotation of boom member 28 about axis 50. It is contemplated that boom member 28, stick member 30, and work tool 32 may be modeled as point masses in Equations (7)-(12).

It is contemplated that the moments due to the centrifugal and inertial forces (i.e., the centrifugal and inertial moments) as well as frictional forces and effects may affect the values of the measured joint torques used in the dynamic model to calculate the mass of the payload. Processing device 48 may correct or compensate the payload calculation for these forces (i.e., swing compensation). Specifically, processing device 48 may correct the payload calculation by correcting or compensating the value of T:

$$T_{2\_Compensated} = T_2 - (MF3_{bo} + MF2_{bo} + MF1_{bo})*sf_1, \quad (13)$$

$$T_{3\_Compensated} = T_3 - (MF3_{st} + MF2_{st})*sf_2, \text{ and} \quad (14)$$

$$T_{4\_Compensated} = T_4 - MCF3_{wt}*sf_3, \quad (15)$$

where $T_2$ is the torque at the joint between platform 12 and boom member 28, $T_3$ is the torque at the joint between boom member 28 and stick member 30, and $T_4$ is the torque at the joint between stick member 30 and work tool 32.

$sf_1$, $sf_2$, and $sf_3$ may be functions that modify the values of the centrifugal and inertial moments depending on the rotational velocity of work implement 18 or the rotational velocity of a given linkage member (the rotational velocities of linkage members 24 being $\dot{\theta}_2$, $\dot{\theta}_3$, and/or $\dot{\theta}_4$, where $\theta_2=\alpha_{bo}+\theta_{bo}$, $\theta_3=\alpha_{st}+\theta_{st}$, and $\theta_4=\alpha_{wt}+\theta_{wt}$). $sf_1$, $sf_2$, and $sf_3$ may correct the centrifugal and inertial moments for frictional forces (e.g., friction in linkage member joints, friction in actuators 26, etc.) and/or frictional effects (e.g., the transition from static to dynamic friction) related to rotation of work implement 18 about vertical pivot 19. For example, the moments due to the centrifugal and inertial forces may be negligible or may not be sensed by force sensors 46 when work implement 18 or a particular linkage member (i.e., boom member 28, stick member 30, or work tool 32) is rotated below the associated threshold velocity $\dot{\theta}_{TH}$. However, when work implement 18 or the particular linkage member is rotated above the threshold velocity $\dot{\theta}_{TH}$, the measured joint torque may be affected by the centrifugal and inertial forces (this threshold behavior may at least partially be caused by a transition from static to dynamic friction in actuators 26 of linkage members 24).

It is contemplated that $sf_1$, $sf_2$, and $sf_3$ may produce a unitless number with a value of between zero and one that may be used to scale the value of the centrifugal and inertial moments. An exemplary representation of $sf_1$, $sf_2$, and $sf_3$ may be:

$$sf_1 = \tan h(k_{bo} * (\dot{\theta}_2/\dot{\theta}_{th,bo})^2) \tag{16}$$

$$sf_2 = \tan h(k_{st} * (\dot{\theta}_3/\dot{\theta}_{TH,st})^2) \text{ and} \tag{17}$$

$$sf_3 = \tan h(k_{wt} * (\dot{\theta}_4/\dot{\theta}_{TH,wt})^2), \tag{18}$$

where $k_{bo}$, $k_{st}$, and $k_{wt}$ are linkage member joint swing compensation factors and $\dot{\theta}_{TH,bo}$, $\dot{\theta}_{TH,st}$ and $\dot{\theta}_{TH,wt}$ are threshold velocities.

The linkage member joint swing compensation factors $k_{bo}$, $k_{st}$, and $k_{wt}$ and the threshold velocities $\dot{\theta}_{TH,bo}$, $\dot{\theta}_{TH,st}$ and $\dot{\theta}_{TH,wt}$ may be obtained by curve-fitting the results of the dynamic model with experimental data obtained from state sensors 44 and force sensors 46. $sf_1$, $sf_2$, and $sf_3$ may thus be tuned for a particular work implement 18 and hydraulic system 40.

It is contemplated that the values of $k_{bo}$, $k_{st}$, and $k_{wt}$ as well as $\dot{\theta}_{TH,bo}$, $\dot{\theta}_{TH,st}$ and $\dot{\theta}_{TH,wt}$ may depend on hydraulic system and/or linkage temperatures. This temperature dependence may be due to variations in hydraulic fluid viscosity and differences in thermal coefficients of expansion of piston assembly 36 and tube 38 (see FIG. 2). To correct for the temperature effects, the values of $k_{bo}$, $k_{st}$, and $k_{wt}$ as well as $\dot{\theta}_{TH,bo}$, $\dot{\theta}_{TH,st}$ and $\dot{\theta}_{TH,wt}$ may be determined within a normal operating system temperature range (i.e., 50-80 degrees C.). Alternatively, the values of $k_{bo}$, $k_{st}$, $k_{wt}$, $\dot{\theta}_{TH,bo}$, $\dot{\theta}_{TH,st}$ and $\dot{\theta}_{TH,wt}$ may be determined at varying temperatures and used in a temperature compensation algorithm or function. Thus, the values of $k_{bo}$, $k_{st}$, $k_{wt}$, $\dot{\theta}_{TH,bo}$, $\dot{\theta}_{TH,st}$ and $\dot{\theta}_{TH,wt}$ may be expressed as functions of hydraulic system and/or linkage temperatures.

Processing device 48 may calculate the mass of the payload and use the calculated mass in order to compensate the joint torque (i.e., the mass of the payload may be required to determine $F_{wt,pl}$). Processing device 48 may then use the compensated joint torque to calculate a new mass of the payload. This iterative process (i.e., using a calculated payload to determine the compensated joint torque and then using the compensated joint torque to determine a new calculated payload) may be continued for set number of cycles or until the solution converges according to a predetermined convergence criteria. The resulting calculated payload mass may be stored in processing device 48 and/or displayed on an operator display (not shown).

INDUSTRIAL APPLICABILITY

The disclosed payload calculation system may be applicable to any machine where calculation of a payload is desired. The compensation for centrifugal, inertial, and frictional forces may increase the accuracy of the payload measurements. The operation of payload calculation system 42 will now be described.

Figure 4:
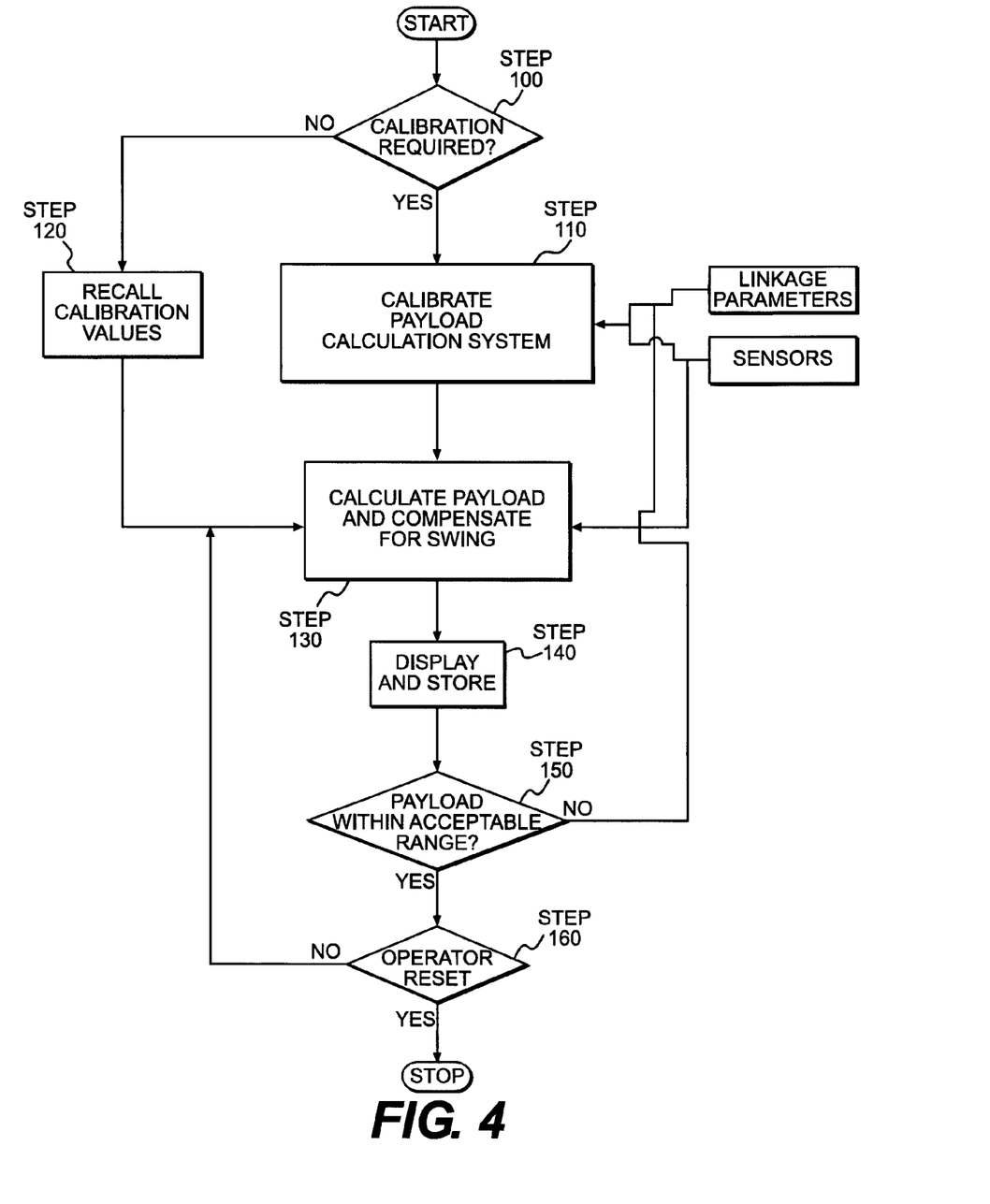
FIG. 4 is a flowchart depicting an exemplary operation of the payload calculation system illustrated in FIG. 2.

As shown in FIG. 4, processing device 48 may first determine if the dynamic model of payload calculation system 42 requires calibration (step 100). Processing device 48 may require calibration of the dynamic model on a set periodic basis or upon a user command. If the dynamic model of payload calculation system 42 requires calibration, processing device 48 may commence the calibration procedure (step 110). During the calibration procedure, processing device 48 may vary the angle of a predetermined linkage member (i.e., boom member 28, stick member 30, or work tool 32) and receive measurements from state sensors 44, attitude sensor 45, and force sensors 46. The sensor data may be used to calculate the parameter vector $\Psi$ of the dynamic model. If payload calculation system 42 has already been calibrated, processing device 48 may recall the parameter vector from the previous calibration (step 120).

Once calibrated, payload calculation system 42 may calculate the mass of the payload moved by work implement 18 and compensate for swing (step 130). For example, machine 10 (see FIG. 1) may be performing a loading operation where it is loading material onto a transport vehicle (not shown). During the loading operation, the operator may command work implement 18 to pick up, move, and thereafter dump a load of material onto the transport vehicle. While moving the load (including rotating platform 12 relative to undercarriage 14), processing device 48 may receive data from state sensor 44 and force sensors 46. Processing device 48 use the received sensor data (i.e., state data and joint torque data) and the pre-programmed linkage data to determine or set the values for T, $W(q,\dot{q},\ddot{q})$, $\Psi$, and $\hat{W}(q,\dot{q},\ddot{q})$ of Equation (6). Processing device may then use a least squares technique and/or an adaptive estimation technique (based on Lyapunov theory) to calculate the mass of the payload $M_{PL}$ from Equation (6).

Processing device 48 may thereafter employ swing compensation to correct the calculation of the payload mass for the effects of rotating platform 12 relative to undercarriage 14 (i.e., swinging work implement 18 about axis 50). Specifically, processing device 48 may correct the payload calculation by correcting or compensating the value of T using Equations (13)-(18). Processing device 48 may then use the compensated joint torque to calculate a new mass of the payload (and repeat). This iterative process (i.e., calculating payload mass, using calculated payload mass to compensate measured joint torque for swing, then using compensated joint torque to calculate new payload mass) may be continued for set number of cycles or until the solution converges according to a predetermined convergence criteria. Once the payload estimation procedure (i.e., step 130) is complete, processing device 48 may display and/or store the calculated payload mass (step 140). It is contemplated that a cumulative calculated payload mass (over a given time period or work cycle) may also be displayed and/or stored.

Processing device 48 may then check the calculated payload mass against a map to determine if the calculated payload mass is within a predefined acceptable range (step 150). The acceptable range may define, for example, the feasible range of masses movable by work implement 18 in a particular period of time. If the calculated payload mass is not within the predefined acceptable range, processing device 48 may re-calculate the payload mass (return to step 130). If the payload mass is within the acceptable range, processing device 48 may determine if the operator has commanded a reset of the payload calculation system 42 via one or more operator input devices located at operator station 20 (step 160). If the operator reset has been commanded, processing device 48 may discontinue the payload measuring routine. Alternatively, processing device 48 may return to estimating the payload mass (return to step 130).

Several advantages of the payload calculation system may be realized. In particular, the compensation for centrifugal, inertial, and frictional forces due to rotation of the work implement may increase the accuracy of the mass measurements. Improved measurements of the payload mass may improve productivity by allowing the disclosed machine to load an associated transport vehicle or container nearer to its maximum capacity. By better ensuring a maximum load with no overload, the disclosed payload calculation system may also decrease maintenance costs of the associated transport vehicle or decrease costly delays in cases where excess material must be removed prior to transport.

It will be apparent to those skilled in the art that various modifications and variations can be made to the disclosed payload calculation system without departing from the scope of the disclosure. Other embodiments of the payload calculation system will be apparent to those skilled in the art from consideration of the specification and practice of the payload calculation system disclosed herein. It is intended that the specification and examples be considered as exemplary only, with a true scope being indicated by the following claims.

What is claimed is:

1. A payload calculation system for use with a work implement, comprising:
   a state sensor configured to measure a state of the work implement; and
   a processing device configured to calculate a mass of a payload moved by the work implement, the processing device being configured to use the measured state to compensate the calculation of the mass for centrifugal, inertial, and frictional forces of the work implement caused by the work implement rotating about a vertical pivot.

2. The payload calculation system of claim 1, wherein the work implement further includes:
   at least one linkage member having an actuator; and
   a force sensor configured to measure a force at the actuator, wherein the processing device is in communication with the force sensor, and the processing device is configured to use the measured force in addition to the measured state to calculate the mass of the payload.

3. The payload calculation system of claim 2, wherein the measured state includes at least one of an angle, an angular velocity, or an angular acceleration of the at least one linkage member.

4. The payload calculation system of claim 3, wherein the processing device is configured to:
   determine a joint torque using the measured force;
   determine one or more moments created by the centrifugal and inertial forces of the work implement; and
   compensate the calculation of the mass by subtracting the moments from the joint torque.

5. The payload calculation system of claim 4, wherein the processing device is configured to modify the value of the moments as a function of the angular velocity of the at least one linkage member.

6. The payload calculation system of claim 5, wherein the processing device is configured to modify the value of the moments as a function of a ratio of the angular velocity of the at least one linkage member and a threshold velocity.

7. The payload calculation system of claim 6, wherein the threshold velocity is a function of temperature.

8. The payload calculation system of claim 1, wherein the work implement is coupled to a platform, the platform is rotatably coupled to an undercarriage via the vertical pivot, and a power source is configured to rotate the platform relative to the undercarriage.

9. A method of calculating a mass of a payload, comprising:
   actuating a work implement to move a payload;
   measuring a state of the work implement;
   calculating a mass of the payload moved by the work implement using the measured state; and
   compensating the calculation of the mass for centrifugal, inertial, and frictional forces of the work implement caused by the work implement rotating about an axis that is substantially normal to a work surface.

10. The method of claim 9, wherein the work implement includes at least one linkage member.

11. The method of claim 10, further including determining a torque acting at a joint of the at least one linkage member, wherein calculating the mass includes using the torque in addition to the measured state.

12. The method of claim 11 wherein the measured state includes at least one of an angle, an angular velocity, or an angular acceleration of the at least one linkage member.

13. The method of claim 12, wherein compensating includes subtracting one or more moments from the torque, the moments being created by the centrifugal and inertial forces.

14. The method of claim 13, wherein compensating includes modifying the value of the moments depending on the angular velocity of the at least one linkage member.

15. The method of claim 13, wherein the calculated mass of the payload is used to determine the value of the moments.

16. The method of claim 15, wherein calculating and compensating are performed in an iterative fashion.

17. A machine, comprising:
   an undercarriage;
   a platform coupled to the undercarriage;
   a work implement coupled to the platform;
   a power source configured to rotate the platform relative to the undercarriage;
   a state sensor configured to measure a state of the work implement; and
   a processing device configured to calculate a mass of a payload moved by the work implement, the processing device being configured to use the measured state to compensate the calculation of the mass for centrifugal, inertial, and frictional forces of the work implement caused by the work implement rotating about a vertical pivot.

18. The machine claim 17, wherein the vertical pivot is configured to couple the platform to the undercarriage.

19. The machine of claim 18, wherein the work implement further includes:
   at least one linkage member having an actuator; and
   a force sensor configured to determine a force at the actuator, wherein the processing device is in communication with the force sensor, and the processing device is configured to use the measured force in addition to the measured state to calculate the mass of the payload.

20. The machine of claim 19, wherein the processing device is configured to:
   determine a joint torque using the measured force;
   determine one or more moments created by the centrifugal and inertial forces of the work implement;
   modify the value of the moments depending on an angular velocity of the at least one linkage member; and
   compensate the calculation of the mass by subtracting the modified moments from the joint torque.

* * * * *